United States Patent Office 3,556,720
Patented Jan. 19, 1971

3,556,720
PREPARATION OF TITANIUM
PHOSPHATE FIBERS
Kenneth E. Cox, Albuquerque, N. Mex., and Henry N. Beck, Walnut Creek, Calif., assignors to The Dow Chemical Company, Midland, Mich., a corporation of Delaware
No Drawing. Continuation-in-part of application Ser. No. 634,106, Apr. 27, 1967. This application Mar. 5, 1969, Ser. No. 804,671
Int. Cl. C01b 25/00; C08g 51/04
U.S. Cl. 23—105
9 Claims

ABSTRACT OF THE DISCLOSURE

The present invention relates to a novel fibrous titanium phosphate product and a method of its preparation by reacting a titanium source material, and a phosphate source material in the presence of water and under controlled reaction conditions.

BACKGROUND OF THE INVENTION

This application is a continuation-in-part of application Ser. No. 634,106, by Kenneth E. Cox and Henry N. Beck, filed Apr. 27, 1967, now abandoned.

This invention relates to inorganic phosphates and more particularly is concerned with a novel crystalline fibrous titanium phosphate and to a process for its preparation.

French Pat. 1,355,809 teaches the preparation of a titanium pyrophosphate material suitable for use as a pigment. More specifically in accordance with the teachings of this patent aqueous solutions of titanium tetrachloride and phosphoric acid are mixed and the resulting precipitate heated at from 750–1100° C., after the optional addition of from 0.1–2 weight percent potassium phosphate, to produce a calcined titanium pyrophosphate pigment material corresponding to the empirical formula $TiP_2O_7$.

A hydrated, substantially impurity free basic titanic phosphate was reported to be precipitated in a granular, readily filterable and washable form by gradually adding, with mixing, a solution of phosphoric acid or an aqueous soluble phosphate to a solution of a titanium sulfate or chloride (U.S. 1,876,065). To obtain the granular prodnuct of this patented process careful control of titanium reactants, excess of free acid and the presence of chlorides all were indicated to be necessary.

Clearfield and Stynes, J. Inorg. Nucl. Chem., 1964, vol. 26, pp. 117–129, reported the stoichiometry and dehydration behavior of a gelatinous zirconium phosphate. In this study, the reaction of an excess of phosphoric acid or soluble phosphate when added to a soluble zirconium salt was indicated to produce a gelatinous product which upon refluxing in phosphoric acid formed crystals which had approximately the same composition as the gels but exhibited a somewhat different dehydration behavior.

Additionally, it is known in the art that whiskers or other elongated acicular inorganic crystalline materials, such as refractory metal carbides, silicon carbide, aluminum oxide, boron nitride, etc., are suitable and effective for reinforcing polymers, metals and other structural materials. Inorganic whiskers available heretofore and the methods of their preparation used to date, however, are quite expensive and not generally commercially applicable.

Nowhere has it been known or suggested in the prior art to prepare crystalline, elongated, fibrous titanium phosphate.

Now, unexpectedly, we have discovered a novel, relatively inexpensive process for preparing titanium phosphate in a unique and useful fibrous crystalline form.

It is a principal object of the present invention to prepare a novel whisker, i.e., fiber form of titanium phosphate.

It is also an object of the present invention to provide a novel process for preparing fibrous titanium phosphate which is simple and relatively inexpensive.

It is a further object of the present invention to provide a novel titanium phosphate product suitable for use as a reinforcing medium in plastics and other structural materials.

These and other objects and advantages readily will become apparent from the detailed description presented hereinafter.

SUMMARY

A first process embodiment of the present invention comprises reacting controlled predetermined concentrations of a titanium source material and an aqueous solution of orthophosphoric acid or water soluble inorganic phosphates at a temperature of from about 225 to about 400° C. for a period of at least about 15 minutes under at least the autogenous pressure of the reaction mixture. The titanium source material is selected from titanium containing salts, oxides, metalloorganics and the like materials which are either soluble in and/or react with the aqueous phosphate solution employed. The molar ratios of titanium source material and phosphate to be employed, expressed as $PO_4^\equiv/Ti^{+4}$, range from about 1 to about 35.

By following this process, crystalline fibers of titanium phosphate having a length/diameter ratio of as high as 100 or more form directly in the reaction mass.

DESCRIPTION OF THE PREFERRED CONDITIONS

In a first process embodiment of the present invention the titanium source material, either as an aqueous solution or in solid particulate form which is soluble in the reaction mixture and/or reacts with the phosphate source material employed is placed in a pressurizable reactor along with the phosphoric acid or aqueous soluble inorganic phosphate source material. Water also is introduced into the reactor in those instances where either one or both of the titanium source material and phosphate source material are in solid form, the quantity of water being such as to provide predetermined reactant concentrations as will be set forth directly hereinafter. The reaction mixture composition is controlled such that the initial titanium source material concentration, expressed as titanium ion, ranges from about 0.05 to about 1.1 molar and the phosphate source material, expressed as $PO_4^\equiv$ ion, ranges from about 0.5 to about 5 molar.

The resulting reaction mass is heated under at least its autogenous pressure at a temperature of from about 225° C. to about 375° C. for a period of at least about 15 minutes. Ordinarily the process is carried out at temperatures from about 250° C. to about 350° C. for a period of about 2 hours. During this reaction period, titanium phosphate fibers having a length of at least about 5 microns, a cross-sectional diameter of from about 0.05 micron to about 1 micron and a minimum length/diameter (L/D) ratio of about 5 and usually at least about 20 form directly in the reaction mass. The fibers may have a length of 100 microns or more.

Following the reaction period, the solid titanium phosphate whiskers are separated from the aqueous liquid phase of the cooled reaction mixture. Usually, these are removed by filtration. If desired, they can be washed with water, e.g., and dried either at room temperature or an elevated temperature, for example, 110–120° C.

Preferably, aqueous orthophosphoric acid and an aqueous titanyl chloride solution ($TiOCl_2$) are reacted in quantities calculated to give a $PC_4/Ti$ molar ratio of from about 1 to about 32. In this embodiment, an aqueous titanyl chloride solution and an aqueous solution of orthophosphoric acid which provide in the reaction mixture a Ti concentration of from about 0.125 to about 1 molar and a $PO_4^\equiv$ concentration of from about 1 to about 4 molar are heated in a sealed reactor at a temperature of from about 250 to about 350° C. for from about ½ hour to about 4 hours or more. Following the reaction period, the reactor is cooled, the product mixture removed therefrom and the solid titanium phosphate fibers separated from the residual reaction mass.

In carrying out the process it has been observed that the reaction time required to prepare fibrous titanium phosphate of the desired high L/D ratios varies in an inverse manner with the temperature employed. Also, it has been found that the titanium source material selected to be employed has some influence on the L/D ratio of the product fibers and that with certain source materials high L/D ratio products are realized at unexpectedly low temperatures.

Optionally, various nucleating agents such as, for example, titanium phosphate fibers themselves or other types of titanium phosphate crystals and the like can be introduced into the reaction mixture prior to processing. When reaction temperatures below 225° are employed, the use of a nucleating agent is necessary to the efficient production of crystals. Introduction of such materials into the reaction mass has been found to provide for increased yield and product quality, particularly at the lower temperature conditions and less preferred but operable reactant concentrations.

The amount of nucleating agent to be employed generally is quite small as based on the total weight of titanium phosphate product to be prepared in a given operation and usually ranges from about 0.05 to about 1 percent and preferably from about 0.125 to about 0.5 percent of the weight of expected titanium phosphate product in the product mass.

In a second process embodiment of the invention, products as described above are prepared by mixing an aqueous solution of orthophosphoric acid or of a soluble inorganic phosphate with an insoluble titanium source material (e.g., rutile or anatase titanium dioxide and titanium ore) and a nucleating agent. In the resulting reaction mixture, the initial titanium concentration, expressed as titanium ion is from about 0.5 to 5 molar. The phosphate ion concentration, expressed as $PO_4^\equiv$, is from 1 to 5 molar. The aqueous reaction mixture is heated at a temperature of from about 175 to 225° C. for a period of from 5 to 60 hours, and the product, i.e., crystalline fibers of titanium phosphate, is separated from the residual aqueous reaction mixture by filtration or other liquid-solid separatory means.

It is preferred in both process embodiments of the present invention to operate at the lowest temperature which will give the titanium phosphate fibers of desired high L/D ratio since the process usually is carried out under the autogenous reaction pressure of the reactant mixture; therefore, any reduction in the process temperature markedly reduces the minimum operating pressure and thus lowers the strength and structural requirements of the operating vessels, reactors and the like.

As indicated hereinbefore, the crystalline titanium phosphate fiber products of the present invention usually range from about 5 to about 100 microns in length (L), are from about 0.05 to about 1 micron in cross-sectional diameter (D), and have an L/D ratio of greater than about 5. The L/D ratio preferably as a minimum averages from about 10 to about 30 and can be as high as 500. Fibers with L/D ratios around 100 are readily prepared.

The Ti/P ratio in the product ranges from about 1.8 to about 0.35, the amount of phosphate condensed into the molecule generally increasing as the process temperature is increased. More specifically, for fibers prepared at a temperature of from about 185° C. to about 225° C. the Ti/P ratio ranges from about 1.8 to about 1.0 and as the reaction temperature increases from about 225° C. up to about 350° C. the Ti/P ratio decreases almost proportionally from about 1.0 to about 0.35.

As prepared, the fibers are acidic in nature and can be titrated with dilute alkali bases. Titrations of the fibers have been carried out at room temperature in ½ molar aqueous sodium chloride solution using 30-second intervals between additions of aliquots of dilute aqueous sodium hydroxide solution and the reading of the resulting pH. [This analytical technique is similar to that applied to ion exchange resins by H. P. Gregor and J. I. Gregman, J. Am. Chem. Soc., 70, 2370 (1948).] Generally, the fibers show two different acidic hydrogens titratable at from about pH 4.7 to 5.4 and from about 8.0 to 9.5. The weaker hydrogen often tends to disappear from products produced at the higher reaction temperatures and longer reaction times suggesting the possibility that the weaker hydrogen (POH) groups condense probably to form P–O–P groups with the elimination of water.

No gross distinguishing differences in the morphology of the fibers produced under different reaction conditions within the scope of the invention are noticed although as indicated hereinbefore these may vary considerably in chemical composition, i.e., in titanium and phosphorus content.

Infrared analysis indicated the presence of hydroxy groups in the compound structure but showed that the fibers are heavily hydrated.

Heating the fibers produces one or two endothermic transitions at approximately 365° C. or 313–345° C. and 376–414° C., depending upon the preparative temperature, with a loss of weight corresponding to about 1 molecule of water per atom or titanium with the fibrous morphology being retained. Those prepared at 250–350° C. show one transition; those prepared at 185–225°C. show two transitions. Continued heating produces an exothermic transition at from about 725 to 775° C. and also results in loss of fiber morphology. In general, as the reaction temperature at which the product is produced increases. However, products which have been heated at 850° C. show a weight loss ranging only from about 13 percent for material produced at the lower operating temperatures and about 9 percent for fibers produced at 350° C.

Titanium source materials suitable for use in preparing the fibrous product can be any of a variety of titanium containing source materials which will dissolve in and/or react with the phosphate source material in the aqueous reaction mixture. Titanyl chloride ($TiOCl_2$), titanium dioxide ($TiO_2$), amorphous and crystalline titanium phosphates, organotitanium compounds, such as tetraalkyl titanate corresponding to the formula $(RO)_4Ti$ where R is an aliphatic hydrocarbon group having a carbon chain length of from 1 to about 10, and the like have been found to be suitable for use as titanium source materials in the practice of the present invention. Good fibers have been prepared directly by the reaction of a titanium-bearing ore with a phosphate source material. A convenient source material is a titanyl chloride solution containing from about 180 to about 200 grams/liter titanium which readily is produced by evaporation of a substantially iron free, highly acidic (8 molar HCl) solution containing from about 40 to about 50 grams/liter titanium. (The leach solution readily can be obtained by hydrochloric acid leaching of acid soluble titanium ores.) The ratio of Cl/Ti ions in this concentrate is about 2.2 indicating a composition corresponding approximately to an empirical formula of $TiOCl_2$.

Although the titanium halides such as titanyl chloride and titanium tetrachloride are readily available, convenient sources of the titanium source material, these do require the use of relatively high reaction temperatures, i.e., about 250° C. and preferably about 350° C. for optimum fiber yield and quality. Additionally, these chloride materials require the use of a more concentrated phosphoric acid reactant. Because of the presence of chloride and reaction temperatures involved, the reaction mixture is inherently corrosive in nature and special structural materials which are not detrimentally attacked or otherwise degraded during the reaction process must be employed in the reaction vessels. With the chloride-containing titanium source material reactant, ordinarily the chloride concentration in the reaction mixture is maintained between about 0.2 and about 2 molar.

The use of such materials as titanyl sulfate, organic titanium compounds, such as tetrabutyltitanate and tetraisopropyltitanate, for example, as well as both the anatase and rutile form of titanium dioxide offers the advantage that these latter source materials are significantly less corrosive under the reaction conditions employed than are the titanium halide materials. Titanium dioxide readily can be obtained in a high purity and thus provides a titanium source material which is substantially completely void of extraneous and interferring anions and is substantially noncorrosive in action. The use of titanium dioxide also provides for use of phosphoric acid of low concentrations thereby further reducing the corrosive nature of the reaction mass and favorably affecting the economics of the process. The titanium dioxide reactant also provides for use of a higher titanium concentration in the reaction mass thereby giving better volume efficiency.

Commercial orthophosphoric acid usually is employed as the source material. However, acidic phosphate salts (such as ammonium dihydrogen phosphate

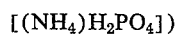
$[(NH_4)H_2PO_4]$ and the corresponding alkali metal phosphates, pyrophosphoric acid and the like, can be employed. Preferably, because of its ready availability in high purity, orthophosphoric acid is used as the phosphate ion source.

The small and intermediate hexagonal platelets of titanium phosphate of the type disclosed in application Ser. No. 812,528, filed Mar. 5, 1969, can be used to replace part or all of the above listed titanium and phosphate sources. However, this material ordinarily is used as a nucleation source or "seed."

Nucleating agents employed, can be selected from any of a variety of finely divided materials which will act as nucleation sites for fiber formation. Small fibers of titanium phosphate itself, either as prepared or ground, the small and intermediate size hexagonal platelets of titanium phosphate set forth directly hereinbefore, and the like materials can be incorporated into the reaction mixture within the concentration ranges set forth hereinbefore. Usually, seed material, if it is used, is finely divided. Where a nucleating agent is employed, the titanium source material will preferably be one of the various forms of $TiO_2$, such as anatase or rutile titanium dioxide. Titanium values as are present in titanium-bearing ores can also be employed.

The process can be carried out using batch, cyclic batch or continuous operations. The reactor processing equipment and the like to be employed can be fabricated from any of a variety of structural materials which will withstand the operating temperatures and reaction conditions. Glass-lined steel reactors and tantalum reactors have been found to be suitable for carrying out the present process.

The following examples will serve to further illustrate the present invention but are not meant to limit it thereto.

EXAMPLE 1

An aqueous titanyl chloride solution ($TiOCl_2$) containing from about 180 to about 200 grams/liter titanium ($Ti^{+4}$) was prepared by vacuum evaporation of a substantially iron free, acidic (8 molar HCl) titanium ore leach solution containing from about 40 to about 50 grams/liter titanium values. The molar ratio of chloride ($Cl^-$) to titanium ($Ti^{+4}$) in the concentrate was about 2.2 indicating the titanium and chloride components were present in relationship corresponding approximately to the formula $TiOCl_2$. Commercial high purity orthophosphoric acid (85–87 percent $H_3PO_4$) was employed as the phosphate source.

A number of studies were made using the "$TiOCl_2$" solution and $H_3PO_4$ acid evaluating the effect of temperature and reactant concentration on fiber production. In each of these runs a Pyrex ampoule about 1 inch diameter and about 12 inches long having a capacity of about 50 milliliters was used as a reactor. Predetermined volumes of reactant materials were introduced into the reactor in the following manner. Titanium solution was first placed in the ampoule followed by distilled water and the ampoule then shaken to achieve a thorough mixing of the contents. The acid was then added and the ampoule sealed. The ampoules were filled to about 75 percent of capacity for runs up to 250° C., to about 50 percent of capacity for runs at 350° C. and to about 20 percent of capacity for runs at 400° C. The percentage filling was based on the calculated expected vapor pressures of the reaction mixture. Three ampoules at a time were loaded into a 1-liter capacity stainless steel Parr bomb. The bomb was positioned on a rocking cradle and heated externally. Temperature control during operation was maintained by an automatic temperature controller device with thermocouples attached to the bomb. After a predetermined time of operation for a given run, the rocking cradle was stopped, the heating mechanism turned off and the bomb and contents allowed to cool. After cooling, the ampoules were removed from the bomb and opened; the contents were removed from each ampoule reactor. Solids were separated from the residual liquid reaction mass by filtering through a medium frit glass filter. The product filter cake was oven dried at about 110°, usually overnight, and the product then examined. Electron microscopy techniques were utilized to determine the crystalline shape and size of the titanium phosphate product.

Additionally, the effect of adding a colloidal titanium dioxide material was examined in several runs. This colloidal $TiO_2$ was prepared by diluting a titanium chloride containing leach solution described directly hereinbefore with distilled water to reduce the titanium value concentration to about 12 grams/liter $Ti^{+4}$. The diluted solution was heated at about 85° C. for about 15 minutes whereupon a colloidal suspension of rutile titanium dioxide particles having a diameter of from about 0.002 to about 0.010 micron precipitated therein.

Run A

An aqueous reaction mixture containing about 0.25 mole/liter of titanium ion, about 0.55 mole/liter chloride ion and about 4 moles/liter of orthophosphoric acid was heated for about 2 hours at 350° C. Samples of the product resulting from this run analyzed about 18.7–31.5 percent Ti and about 22.3–30.9 percent phosphate, i.e. a molar Ti/P ratio of about 0.39–0.84. The titanium phosphate product was substantially in the form of fibrous whiskers averaging about 10 microns in length (L) and about 0.1 micron in diameter (D), i.e., a L/D ratio averaging about 100.

Run B

Samples of an aqueous reaction mixture either 0.125 molar or 0.25 molar in titanium, about 0.28 or 0.55 molar in chloride and either about 2 or 4 molar in phosphate were heated for about 2 hours at a predetermined temperature within the range of from about 150° C. to about 400° C. The results of this study are summarized in Table I which follows:

TABLE I

| | Ti, mol | PO$_4$, mol | Cl, mol | Reaction temp., °C. | Average L (μ) | Crystal D (μ) | Average L/D (ratio) |
|---|---|---|---|---|---|---|---|
| Run No.: | | | | | | | |
| 1 | 0.125 | 2.0 | 0.28 | 150 | No fibers formed | | |
| 2 | 0.125 | 2.0 | 0.28 | 250 | 2.5 | 0.1 | 25 |
| 3 | 0.125 | 2.0 | 0.28 | 350 | 2.0 | 0.1 | 30 |
| 4 | 0.25 | 4.0 | 0.55 | 250 | 8.0 | 0.8 | 10 |
| 5 | 0.25 | 4.0 | 0.55 | 350 | 10.0 | 0.1 | 100 |
| 6 | 0.25 | 2.0 | 0.55 | 150 | No fibers formed | | |
| 7 | 0.25 | 2.0 | 0.55 | 250 | 3.0 | 0.075 | 40 |
| 8 | 0.25 | 2.0 | 0.55 | 350 | 8.0 | 0.20 | 40 |
| 9 | 0.25 | 4.0 | 0.55 | 400 | Spherical particles diameter 0.075–0.15 | | |

The results from this study indicate that for the titanyl chloride and phosphoric acid reactants temperatures of 150° C. are too low for operability in the present process and a temperature of 400° C. was too high to produce the novel phosphate fiber.

Run C

A number of runs were made wherein the titanium concentration of the reaction mixture was varied from about 0.125 to about 1 molar, the chloride ion concentration varied from about 0.28 to about 2.2 molar and the aqueous orthophosphoric acid concentration ranged from about 1 to about 4 molar. In each case the reaction mixture was heated for about 2 hours at a temperature of either about 250 or 350° C. Table II summarizes the results of this study.

TABLE II

| | Concentration Ti (molar) | Concentration Cl (molar) | Concentration aqueous H$_3$PO$_4$ (molar) | Reaction temp. (°C.) | Reaction time (hours) | Remarks |
|---|---|---|---|---|---|---|
| Run No.: | | | | | | |
| 1 | 0.125 | 0.28 | 3 | 250 | 2 | Small and medium fibers. |
| 2 | 0.125 | 0.28 | 2 | 350 | 2 | Fibers. |
| 3 | 0.125 | 0.28 | 4 | 350 | 2 | Do. |
| 4 | 0.25 | 0.55 | 1 | 250 | 2 | Short to medium fibers. |
| 5 | 0.25 | 0.55 | 3 | 250 | 2 | Fibers. |
| 6 | 0.25 | 0.55 | 4 | 250 | 2 | Very good fibers. |
| 7 | 0.25 | 0.55 | 2 | 250 | 2 | Fibers. |
| 8 | 0.25 | 0.55 | 4 | 350 | 2 | Good fibers. |
| 9 | 0.50 | 1.1 | 4 | 250 | 2 | Do. |
| 10 | 0.50 | 1.1 | 4 | 350 | 2 | Small, medium, and large fibers. |
| 11 | 0.50 | 1.1 | 4 | 350 | 2 | Good fibers. |
| 12 | 0.75 | 1.65 | 4 | 250 | 2 | Fibers with some fines. |
| 13 | 0.75 | 1.65 | 4 | 350 | 2 | Good fibers. |
| 14 | 0.75 | 1.65 | 5 | 350 | 2 | Good fibers and some fines. |
| 15 | 1.0 | 2.2 | 4 | 250 | 2 | Short and medium fibers. |

The fibers produced by these runs ranged from about 5 to about 100 microns in length and had a cross-sectional diameter ranging from about 0.05 to about 1 micron. The L/D ratio of these products ranged from about 5 to about 500.

Run D

An aqueous reaction mixture about 2.2 molar in chloride, 1 molar in titanium ion and about 2 molar in phosphate ions was employed in a study to evaluate the effect of colloidal titanium dioxide addition on fiber formation. Three identical batches of the reaction mixture were prepared. To one of these about 6 percent by weight of the total mixture of a colloidal titanium dioxide was added and in a second about 12 percent by weight of the colloidal TiO$_2$ mixture was used. The resulting reaction mixtures were heated for about 2 hours at about 250° C. The results of this study are summarized in Table III.

TABLE III

| | Weight percent colloid in reaction mixture | Average dimensions of elongated crystals | | |
|---|---|---|---|---|
| | | Length (μ) | Diameter (μ) | Average L/D |
| Run No.: | | | | |
| 1 | 0 | 1.5 | 0.03 | 50 |
| 2 | 6 | 2.5 | 0.125 | 20 |
| 3 | 12 | 2.5 | 0.06 | 407 |

EXAMPLE 2

A reaction mixture of about a 0.6 molar solution of substantially anhydrous titanium tetrachloride (TiCl$_4$) in water and orthophosphoric acid about 2 hours utilizing the apparatus and technique described in Example 1. The fibrous titanium phosphate crystals produced in this run averaged about 8 microns in length and were about 0.2 micron in cross-section diameter (L/D ratio about 40). In a second run, the same reaction conditions and reactants were employed except that the initial titanium tetrachloride solution was about 0.3 molar. The resulting product was substantially the same size and composition as that produced in the run using the 0.6 molar titanium tetrachloride solution.

EXAMPLE 3

Titanium dioxide in the anatase form was used with orthophosphoric acid to prepare titanium phosphate fibers. A number of runs were made using anatase in a concentration of from about 0.25 to about 1 molar in the reaction mixture and phosphoric acid from about 1 to about 4 molar. Additionally, titanium phosphate fibers or small hexagonal titanium phosphate platelets were used as nucleating agents in some of the runs in an amount of about 0.5 percent by weight of the calculated quantity of expected titanium phosphate product. A number of runs were made at temperatures of from about 175° C. to about 350° C. at process times ranging from about 2 to about 24 hours. Fibers having a titanium/phosphate ratio ranging from about 1 to about 1.8 were obtained at reaction temperatures of from about 175° C. to about 225° C. while fibers having lower titanium/phosphate ratios were obtained at the higher reaction temperatures. The fibers themselves ranged in length from about 5 to about 100 microns and were from about 0.05 to about 1 micron in cross-sectional diameter. In general, the fibers had a L/D ratio of from about 20 to about 100. A good yield of fibers was obtained over the temperature range from 225° to 350° C. without the use of a nucleating agent. It was found to be preferable to carry out the process at a temperature of at least about 250° C. At the lower temperatures, i.e., from 175° to 225° C. the use of a nucleating agent was found to favorably increase the amount and size of fibers produced for a given reaction time.

In separate studies good fibers were obtained using rutile ore containing 31.6 percent titanium as the titanium source material and aqueous orthophosphoric acid.

EXAMPLE 4

In a large scale preparation of fibers, the following were added in the order listed to a 30-gallon capacity glass lined Pfaudler kettle; distilled water, 83.85 liters; concentrated 85 percent orthophosphoric acid, 6.15 liters; anatase titanium dioxide, 5.39 kilograms; and finely divided titanium phosphate nucleating fibers, 66 grams. This provided a reaction mixture which was about 0.75 molar in titanium ion and about 1 molar in phosphate ion. The kettle was sealed and heated with agitation at a temperature of from about 185° to about 190° C. for 26 hours. The maximum pressure generated in the reaction mixture over the processing period was about 200 pounds per square inch. Following the reaction period, the kettle was cooled to ambient temperature, the contents removed therefrom and the solid product separated from the aqueous reaction mixture by filtering. This product was washed with distilled water until the filtrate reached a pH of about 3.5. The resulting fibrous product was dried to a constant weight at about 118° C. in an air circulating oven and found to have been obtained in a product yield of about 24 pounds. Electron microscopy examination of the product fibers indicated these to have an average length of about 20 microns and an average diameter of about 0.4 micron indicating an L/D ratio of about 50. The actual measured particle sizes were found to range from about 5 to about 500 microns in length and from about 0.05 to about 1 micron in diameter. In general, the L/D ratio was found to range from about 20 to about 100 although many particles were found to have an L/D ratio of greater than 100. Analysis of the aqueous phase of the reaction mixture indicated that about 0.74 mole of phosphate had reacted with about 0.75 mole of titanium thus producing a titanium phosphate fiber having a titanium/phosphate ratio of about 1.02.

A sample of the fibers was heated for one hour at 500° C. whereupon about a 10.23 weight loss was found. After 1 hour heating at 850° C. the weight loss was found to be 11.09 percent.

EXAMPLE 5

An aqueous solution of commercial titanyl sulfate, containing approximately 1.7 moles $H_2SO_4$/mole of $TiOSO_4$ was used as a titanium source material. A reaction mixture which was about 0.25 molar in $TiOSO_4$ and about 4 molar in orthophosphoric acid was heated in a sealed reactor at a temperature of about 350° C. for about 2 hours. The resulting fibrous product had a titanium concentration of about 20 percent and a phosphorus concentration of about 21.5 percent indicating a titanium/phosphate molar ratio of about 0.6.

In a second run the reaction was repeated except that the reaction temperature employed was about 250° C. The titanium phosphate fibrous product had the same crystalline characteristics and crystal size except analysis showed this material had about 23 percent titanium and about 19.6 percent phosphate indicating a titanium/phosphate molar ratio of about 0.75.

In a third preparation, before use in the process, excess sulfuric acid was removed from the titanyl sulfate employed by washing with acetone. In this preparation, titanium phosphate fiber as a nucleating agent in an amount of about ½ percent by weight of the calculated titanium phosphate fiber product was added to the reaction mixture. Fibers of the same crystalline form and size as set forth in the preceding run were obtained at a reaction temperature of about 225° C.

EXAMPLE 6

A number of fiber preparations were prepared using organic titanium compounds as the titanium source material. In these runs, an aqueous reaction mixture either tetrabutyltitanate or tetraisopropyltitanate was reacted with orthophosphoric acid at a temperature of about 350° C. for about 2 hours using a technique and apparatus similar to that described in Example 1. The reactant concentrations employed and results of this study are summarized in Table IV.

TABLE IV

| | Titanium source | Reactant concentration | | Product |
|---|---|---|---|---|
| | | Ti, mol | $H_3PO_4$, mol | |
| Run No.: | | | | |
| 1 | $(BuO)_4Ti$ | 0.25 | 2 | Short fibers and some chaff. |
| 2* | $(BuO)_4Ti$ | 0.25 | 2 | Medium size fibers. |
| 3 | $(BuO)_4Ti$ | 0.25 | 4 | All sizes of fibers and some crystals. |
| 4 | $(i-PrO)_4Ti$ | 0.25 | 2 | Short and poor fibers. |
| 5 | $(i-PrO)_4Ti$ | 0.25 | 4 | Good fibers plus chaff. |

*Nucleated with ½% titanium phosphate fibers.

EXAMPLE 7

An aqueous reaction mixture which was about 0.25 molar in titanyl chloride and about 4 molar in ammonium dihydrogen phosphate [$(NH_4)H_2PO_4$] was heated for about 2 hours at about 350° C. following the technique and employing an apparatus of the type described in Example 1. Fibrous material of crystalline habit shown for the products realized using phosphoric acid was obtained in this run.

EXAMPLE 8

A 320-milliliter Pyrex glass ampoule was charged with about 11 milliliters of a titanyl chloride concentrate solution substantially the same as that described in Example 1. This solution was about 3.9 molar in titanium and about 8.6 molar in chloride. Additionally, about 104 milliliters of distilled water and about 45 milliliters of a 14.6 molar orthophosphoric acid were introduced into the ampoule following the procedure described in Example 1. The concentrations of titanium, phosphate and chloride in the resulting reaction mixture were about 0.27 molar, about 4.1 molar and about 0.59 molar, respectively. The ampoule was sealed, placed in the Parr bomb and heated for about 2 hours at 350° C. The autogenous pressure generated during the reaction period was about 2400 pounds/square inch. Following the reaction period and after cooling of the reaction mix, the reaction mixture was removed from the reactor and the fibrous solid materials therein recovered by filtration, washed with distilled water, dried at room temperature and examined under an electron microscope. The average crystal whisker dimensions were found to be about 20 microns in length and about 0.1 micron in cross-sectional diameter thus having an L/D ratio of about 200. The yield of the fiber product was substantially quantitative.

A sample of the fibers obtained from this run was repulped with water, the pulp adjusted to a pH of about 7.5 with dilute sodium hydroxide and filtered. The resulting product after drying was tested as a reinforcing agent in polypropylene. In this test an intimate dispersion of about 30 weight percent of the so-neutralized titanium phosphate whiskers and 70 weight percent of a general purpose easy flow polypropylene (Dow polypropylene 701) was formulated. Standard test bars were prepared by compression molding. Similar molded bars prepared from the polypropylene alone were tested as a control. The results of standard physical tests run both with the composite and the control bars are summarized in Table V which follows:

TABLE V

| Test | Titanium phosphate reinforced polypropylene | Polypropylene (control) |
|---|---|---|
| Tensile strength (p.s.i.) | 5,700 | 4,400 |
| Tangent modulus (p.s.i.) | 318,000 | 119,000 |
| Izod (ft. lbs./in-notch) | 0.44 | 0.22 |
| Tensile yield strain (percent) | 6.5 | 14.0 |

The results from these standard physical tests clearly show the effectiveness of the fibrous titanium phosphate product of the present invention as a reinforcing agent.

Various modifications can be made in the present invention without departing from the spirit or scope thereof for it is understood that we limit ourselves only as defined in the appended claims.

We claim:

1. Fibrous crystalline titanium phosphate wherein the fibers range in length from about 5 to about 100 microns and have a diameter of from about 0.05 to about 1 micron, and wherein the length/diameter ratio is at least about 5.

2. The fibrous titanium phosphate as defined in claim 1 and having a length/diameter ratio of at least about 20.

3. The fibrous titanium phosphate as defined in claim 1 wherein the titanium/phosphate mole ratio ranges from about 1.8 to about 0.35.

4. A process for preparing fibrous titanium phosphate having a length/diameter ratio of at least about 5 which comprises:
   (a) providing as a reaction mixture a titanium source material and an aqueous phosphate source material, the initial titanium source material concentration, expressed as titanium ion, ranging from about 0.05 to about 1.1 molar and the phosphate source material, expressed as phosphate ion, ranging from about 0.5 to about 5 molar, and the phosphate/titanium molar ratio in the reaction mixture ranging from about 1 to about 35,
   (b) heating said reaction mixture under its autogenous pressure at a temperature of from about 225° C. to about 375° C. for a period of at least about 15 minutes, and
   (c) separating fibrous titanium phosphate having a length/diameter ratio of at least about 5 from the residual mass.

5. The process as defined in claim 4 wherein the reaction mixture is heated at a temperature of from about 250° C. to about 350° C. for a period of about 2 hours.

6. The process as defined in claim 4 wherein the titanium source material is a member selected from the group consisting of titanyl chloride, titanium tetrachloride, titanyl sulfate, titanium dioxide, tetraalkyl titanates corresponding to the formula $(RO)_4Ti$ where R is an aliphatic hydrocarbon group having a carbon chain length of from about 1 to about 10, small and intermediate size hexagonal-shaped crystalline titanium phosphate and titanium-bearing ores, and the phosphate source material is orthophosphoric acid.

7. The process as defined in claim 4 wherein the titanium source material is an aqueous titanyl chloride solution containing from about 180 to about 200 grams/liter titanium and having a molar ratio of chloride/titanium ions of about 2.2.

8. A process comprising:
   (a) mixing an aqueous solution of orthophosphoric acid or of a soluble inorganic phosphate with a titanium source material and adding also a finely divided titanium phosphate nucleating agent, thereby to provide a reaction mixture having an initial titanium concentration expressed as titanium ion, of from about 0.5 to 5 molar and a phosphate concentration, expressed as $PO_4$ ion, of from about 1 to 5 molar, and a seed concentration of from about 0.05 to about 1.0 weight percent of the total calculated fibrous titanium phosphate product,
   (b) heating said reaction mixture under at least its autogenous pressure at a temperature of from about 175 to 225° C. for a period of from 5 to 60 hours, and
   (c) separating crystalline fibers of titanium phosphate from the residual aqueous reaction mixture.

9. A process as in claim 8 wherein filtration is the method employed for separating the fibers from the residual aqueous reaction mixture.

References Cited

UNITED STATES PATENTS 2,772,244  11/1956  Shalet _____ 252—437

FOREIGN PATENTS 725,091  1/1966  Canada _____ 23—105

OSCAR R. VERTIZ, Primary Examiner

G. A. HELLER, Assistant Examiner

U.S. Cl. X.R.

260—37, 41

PO-1050
(5/69)

UNITED STATES PATENT OFFICE
CERTIFICATE OF CORRECTION

Patent No. 3,556,720      Dated January 19, 1971

Inventor(s) K. E. Cox and H. N. Beck

It is certified that error appears in the above-identified patent and that said Letters Patent are hereby corrected as shown below:

In column 3, line 6, "$PC_4/Ti$" changed to --$PO_4/Ti$--.

In column 4, after line 45 add --the actual weight loss upon heating decreases slightly--.

In column 7, Table III, Run No. 3, "407" changed to --40--.

In column 8, line 17, after the word "acid" add --(about 2 molar) was heated at about 350°C for--.

In Claim 4, step (b), after the word "under" please add --at least--.

Signed and sealed this 14th day of September 1971.

(SEAL)
Attest:

EDWARD M. FLETCHER, JR.      ROBERT GOTTSCHALK
Attesting Officer      Acting Commissioner of Pate